(12) United States Patent
Bülow

(10) Patent No.: US 7,257,290 B2
(45) Date of Patent: Aug. 14, 2007

(54) MULTI-WAVELENGTH CD AND PMD COMPENSATOR

(75) Inventor: Henning Bülow, Kornwestheim (DE)

(73) Assignee: Alcatel, Paris (FR)

( * ) Notice: Subject to any disclaimer, the term of this patent is extended or adjusted under 35 U.S.C. 154(b) by 123 days.

(21) Appl. No.: 11/097,325

(22) Filed: Apr. 4, 2005

(65) Prior Publication Data

US 2005/0254749 A1    Nov. 17, 2005

(30) Foreign Application Priority Data

May 17, 2004  (EP) .................. 04291260
Nov. 5, 2004   (EP) .................. 04292626

(51) Int. Cl.
*G02B 6/26* (2006.01)

(52) U.S. Cl. .............. 385/27; 385/11; 385/24

(58) Field of Classification Search .......... 385/24, 385/27, 11
See application file for complete search history.

(56) References Cited

U.S. PATENT DOCUMENTS

| 6,317,240 | B1* | 11/2001 | Penninckx et al. ....... 398/147 |
| 6,710,904 | B1 | 3/2004 | Penninckx et al. |
| 6,778,782 | B1* | 8/2004 | Watley et al. ............ 398/147 |
| 2003/0223056 | A1 | 12/2003 | Xiaoli et al. |

FOREIGN PATENT DOCUMENTS

| WO | WO 02/080411 A | 10/2002 |
| WO | WO 03/040777 A | 5/2003 |

* cited by examiner

*Primary Examiner*—Sarah Song
(74) *Attorney, Agent, or Firm*—Sughrue Mion, PLLC

(57) ABSTRACT

The present invention concerns a method for performing optical dispersion compensation of wavelength division multiplexed (WDM) optical signals. The method comprises the steps of providing a compensation stage with an optical transmission medium to be used as parallel operating cascade of polarization controllers and optical birefringent elements to compensate dispersion of the WDM optical signals when being transmitted spectrally dispersed into the different wavelength channels in parallel through the parallel cascades. The method is being characterized by determining the chromatic dispersion of the optical signals at one or few different wavelength channels possibly allowing an extrapolation of the chromatic dispersion to the other wavelength channels for defining accordingly an additional feedback signal to be used for the polarization controller setting.

9 Claims, 2 Drawing Sheets

US 7,257,290 B2

MULTI-WAVELENGTH CD AND PMD COMPENSATOR

TECHNICAL FIELD

The present invention relates to a method for performing optical dispersion compensation of wavelength division multiplexed WDM optical signals providing a compensation stage with an optical transmission medium to be used as parallel operating cascade of polarization controllers and optical birefringent elements to compensate dispersion of WDM optical signals when being transmitted spectrally dispersed into the different wavelengths channels in parallel through the polarization controller. Furthermore, it is related to a computer readable medium having a computer program recorded thereon, the computer program comprising codes adapted to perform a procedure when said computer program is run on a control unit for an optical transmission medium to be used as polarization controllers to compensate dispersion of wavelength division multiplexed WDM optical signals. The invention is based on the priorities applications EP 04 291 260.0 and EP 04 292 626.1 which are hereby incorporated by reference.

BACKGROUND OF THE INVENTION

The input data stream of an optical transmission system may be viewed as a series of light pulses representing digital bits. The bit rate of current optical transmission systems generally range from 10 Gbit/s to 40 Gbit/s resulting in light pulses (or bit periods) that are, respectively, 100 to 25 picoseconds (psecs) wide.

Receivers in an optical transmission system convert each bit period in the data stream into digital ones or zeros by determining, for each bit period, whether a light pulse has been received (digital one) or not (digital zero).

Polarization mode dispersion (PMD) is a phenomenon that may distort the light pulses of the data stream and thus impair the ability of a receiver to determine whether a bit period should be converted into a one or zero. As a result, PMD limits the transmission accuracy and capacity of optical transmission systems and therefore is a critical parameter in optical communications. The fundamental mode of a single mode optical fiber is the solution to the wave equation that satisfies the boundary conditions at the core-cladding interface. Although this appears to be counter-intuitive, there are two solutions to the wave equation that correspond to the fundamental mode. The fiber is deemed to be a single mode fiber because both solutions have the same propagation constant. The two solutions are referred to as the polarization modes. These polarization components are mutually orthogonal. The state of polarization refers to the distribution of light energy between the two polarization modes. In practice, since the cross-sectional area of a fiber is not perfectly circular, the two polarization modes have slightly different propagation constants that give rise to pulse spreading. One polarization mode is referred to as the "fast-mode", and the other polarization mode is known as the "slow-mode". The fast mode and the slow mode mix as they travel down the fiber, becoming indistinguishable. The resulting difference in propagation time between polarization modes is known as the differential group delay.

Optical signal transmitted through an optical fiber are subjected also to another physical dispersion known as chromatic dispersion (CD). This occurs because each wavelength of the optical signals travels through a given medium, such as an optical fiber, at a different speed. Since the various wavelengths of light have different velocities, a given wavelength of light will arrive at a receiver disposed at the end of a transmission fiber before another wavelength of light will arrive at that receiver. The time delay between different wavelengths of light leads to pulse broadening. Chromatic dispersion is obtained in an optical fiber by measuring fiber group delays in the time domain. Chromatic dispersion is a relatively stable phenomenon. It can be in the range of 300-500 psec in a 10 Gb/s system before incurring a 1 dB power penalty. In a 40 Gb/s system, the range decreases to 18-25 psec.

CD can be time variant as a result of changes with temperature or stress, but typically, the time variance of CD is not particularly strong. PMD, on the other hand, is very time variant, and thus, compensation should track with time. PMD describes the statistical broadening of optical pulses within an optical fiber caused by polarization effects. This broadening effect, similar to pulse broadening from chromatic dispersion, ultimately prevents the correct detection of the waveform at the receiver.

In WO 03/040777 is described an integrated system for performing dispersion compensation on wavelength channels in WDM or DWDM transmissions (D for dense). The system includes a tunable integrated dispersion compensation module that performs chromatic dispersion compensation and polarization mode dispersion compensation on each of the wavelength channels in the transmission. Feedback is used to adjust the tunable integrated dispersion compensation module until receiver performance is optimized. Such an integrated system as described in WO 03/040777 has the big disadvantage to require a specific dispersion compensation module for each different wavelength channels of the optical signals. A dispersion compensation using such solution will imply high costs and therefore can not be really efficient.

In WO 02/080411 is described a method and apparatus for compensation for polarization mode dispersion (PMD) in an optical transmission system without perturbing the laser source. Such optical PMD compensator is rather attractive for bit rates from 10 GHz to 40 GHz WDM optical transmission system. Indeed, the approach is cost-effective due to parallel processing of many channels within one hardware (Liquid crystal display array for polarization controllers) and one birefringent crystal (polarization maintaining fiber) for all parallel wavelength channels. Also only one wavelength scanning polarimeter (feedback signal) is shared among all channels. Furthermore, it is taken advantage of the use of fastfeed-forward adaptation which avoids time consuming dither techniques i.e. consecutive variations of polarization controller tuning parameters into the direction of an optimized feedback signal.

Nevertheless, a solution as proposed in WO 02/080411 has still the big drawback that neither chromatic dispersion (CD) or transmitter shirp nor self-phase modulation (SPM) can be compensated.

SUMMARY OF THE INVENTION

In view of the above, it is an object of the present invention to provide a method for perfuming optical dispersion compensation of wavelength division multiplexed optical signals based not only on polarization mode dispersion but also on chromatic dispersion in a cost effective way.

This object is achieved in accordance with the invention by applying a method for performing optical dispersion compensation of wavelength division multiplexed (WDM) optical signals. The method comprise the steps of providing a compensation stage with an optical transmission medium to be used as parallel operating cascade of polarization controllers and optical birefringent elements to compensate dispersion of the WDM optical signals when being transmitted spectrally dispersed into the different wavelength channels in parallel through the parallel cascades. The polarization states of the different wavelength components of each channel (polarization spectrum of each channel) of the whole optical signals has to be determined to define accordingly a signal for each channel (here referred to as PMD feedback signal) required for time efficient setting of the polarization controllers in one step when compensating in parallel the polarization mode dispersion at each different wavelength channel by parallel arranged polarization controller and birefringent element cascades. The method is characterized by the further steps of determining the chromatic dispersion of the optical signals at one or few different wavelength channels in addition. Such measurement of the chromatic dispersion can be used possibly to extrapolate the chromatic dispersion occurring at the other wavelength channels. Then, a feedback signal (here referred to as feedback signal 2 or CD feedback signal) has to be defined accordingly as required when compensating in parallel the chromatic dispersion at each different wavelength channel. The polarization controller setting per wavelength channel is calculated using feedback signals from both polarization mode dispersion (PMD feedback signal) and chromatic dispersion (CD feedback signal). And finally, the respective setting are applied in parallel on the polarization controllers to compensate optical dispersion of the WDM optical signals at each different wavelength channel.

In accordance with another aspect of the invention, its object is achieved by a computer readable medium having a computer program recorded thereon, the computer program comprising codes adapted to perform a procedure when said computer program is run on a control unit for an optical transmission medium to be used as polarization controllers to compensate dispersion of wavelength division multiplexed WDM optical signals. Such procedure corresponds to an adaptation algorithm performing a step of collecting feedback signal (PMD feedback signal) required for the polarization controllers setting when compensating in parallel the polarization mode dispersion at each different wavelength channel of the WDM optical signals when being transmitted spectrally dispersed into the different wavelength channels through the polarization controller. That procedure is characterized by collecting feedback signal (CD feedback signal) required when compensating in parallel the chromatic dispersion at each different wavelength channel. Then, the polarization controller setting per wavelength channel is calculated using feedback signals from both polarization mode dispersion and chromatic dispersion. Finally, the control unit provides in parallel the respective setting on the polarization controllers to compensate optical dispersion of the WDM optical signals at each different wavelength channel.

Advantageous developments of the invention are described in the dependent claims, the following description and the drawings.

DESCRIPTION OF THE DRAWINGS

An exemplary embodiment of the invention will now be explained further with the reference to the attached drawings in which.

DETAILED DESCRIPTION OF PREFERRED EMBODIMENTS

Figure 1:
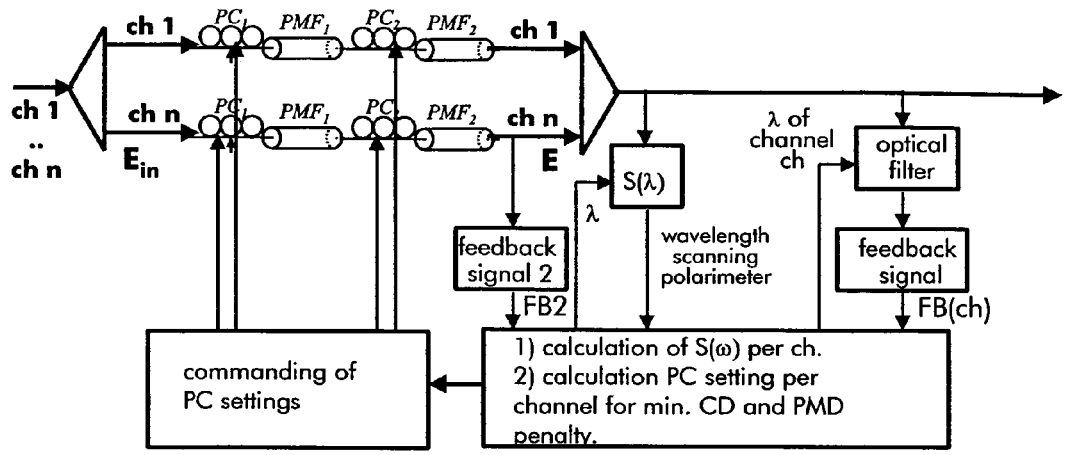
FIG. 1 is a diagram of a compensation stage according to the invention.

The structure of a multi-channel dispersion compensator is shown on FIG. 1. It is similar to a multi-channel PMD compensator except the at least one further feedback signal sensitive for CD variation (FB, FB1, FB2, . . . ) for the new control algorithm which work even in the absence of PMD determining the optimum compensation for chromatic dispersion. Such control algorithm is adapted to determine the optimum setting mitigating both distortions coming from CD and PMD. In detail, the structure works as follows: A wavelength demux distributes each channel at an individual cascade of polarization controller PC and birefringent element polarization maintaining fiber (PMF). A cascade of two is shown, but more would be conceivable. At the output, the signals of all parallel operating cascades are concentrated again in one fiber by a wavelength mux. At the output of the mux a spectral polarimeter determines the polarization spectrum of each channel; this could be performed by a scanning optical filter followed by a polarimeter. From the extracted polarization information (e.g. polarization describing Stokes vector S vs. optical frequency ω, the optimum setting of the PCs to minimize the distortion (leading to a penalty) is calculated and commanded to the PCs.

Compared to the state-of-the-art, a feedback signal for the CD mitigation is added according to the invention. Two alternatives of positioning the feedback signal generation unit are sketched out in FIG. 1. Additional alternatives are shown in FIG. 2:

At the common output of the signal processing unit an optical channel filter selects a channel, which generates the feedback signal FB (PMD feedback signal) for the adaptation control unit.

Figure 2:
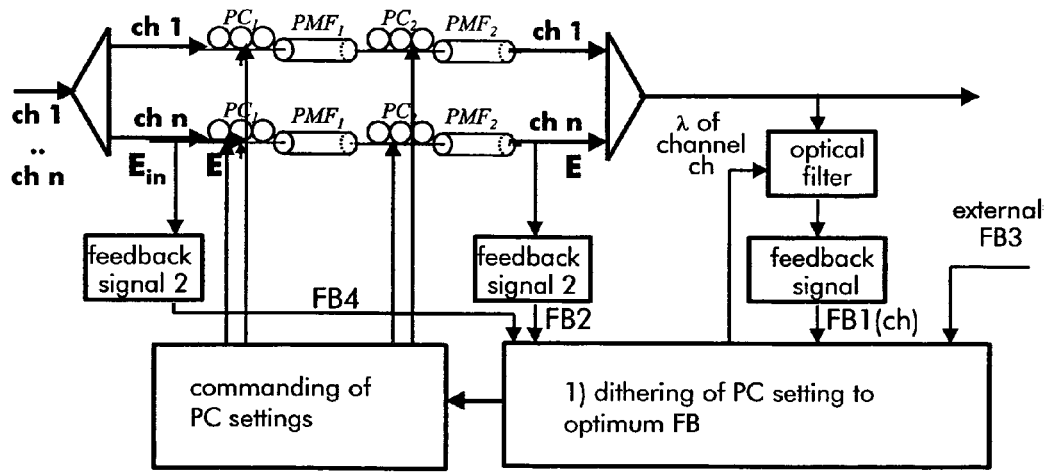
FIG. 2 is a diagram of a similar compensation stage showing different possible origin for the used feedback signal.
Figure 3:
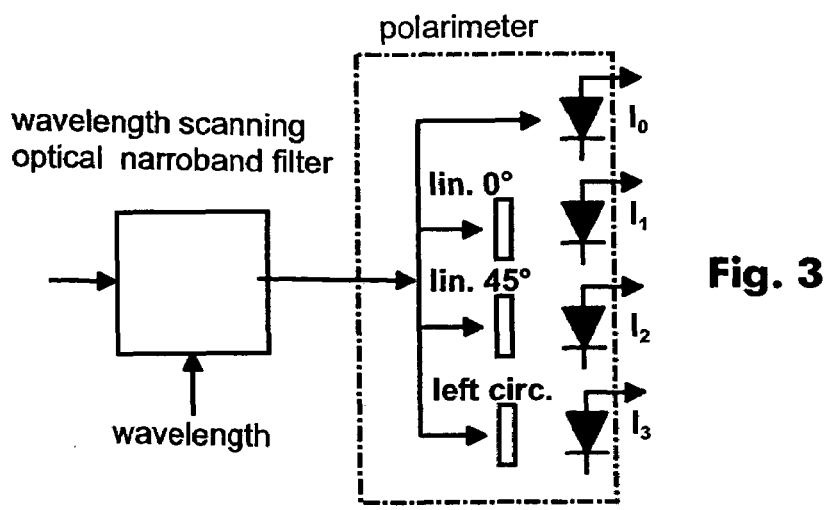
FIG. 3 is a diagram of a wavelength scanning polarimeter.

The feedback signal FB2 (CD feedback signal) is extracted from a single channel path within the signal processing (see FIG. 1 and FIG. 2).

Alternatively, a feedback signal can be extracted at the signal processing input, as for FB4 (CD feedback signal) shown in FIG. 2 or with an optical filter as FB1 (PMD feedback signal) in FIG. 2, but at the common input port.

A feedback signal FB3 (see FIG. 2) from an external unit can also be applied. It is directly related to the forward error correction (FEC) error count which is extracted from the FEC circuit in a receiver for one channel.

Two different kinds of feedback signal for the CD compensation can be applied:

i. A scalar signal which has to be maximized (or minimized) such as eye monitor feedback (eye opening, Q-factor estimate); but also FEC error count, which has to be minimized, belongs to this group. These FB signals are sensitive to any signal degradation, hence also to a non-compensated PMD compensation. Therefore they can only be extracted from the output side of the compensator (FB1, FB2, FB3 of FIG. 2).

ii. A signal which is a direct measure of the chromatic dispersion. It is not applicable for all modulation formats. It splits upper and lower side-band from the optical channel, detects them separately in two receivers, and compares the clock phase difference between the two receivers. This difference is a direct measure for the CD. Since it is blind for PMD distortion, it can be extracted at both sides of the compensator, i.e. FB4 (then it measures the link CD) or also FB2 and FB3 (then it measures the link+actually set compensator CD).

The adaptation algorithm is implemented in the control unit for a simultaneous PMD and CD compensation depending on the feedback signal. Nevertheless, parallel to the CD adaptation and compensation based on the observation of the CD relevant feedback signals, the PMD compensation is applied by the feedforward adaptation scheme. In general PMD compensation operates on a different time scale (faster).

- With help of the wavelength scanning polarimeter measurement of each channel, the link PMD-compensating polarization transfer function W (explained below) is determined by the control unit.
- Then the chrom. dispersion $CD_c$ is determined on basis of the CD feedback signals, which has to be generated by the signal processing to mitigate also the CD of the link.
- Then the setting $p_{ik}$ of the PCs in the signal processing for each channel is calculated to mitigate both, PMD and CD.
- Finally the settings are commanded to the PCs.

The CD adaptations differs fort the different feedback signals FB:
i. For a scalar FB signal a dither adaptation scheme is applied, which relies on detuning the generated compensator dispersion $CD_c$ to a new value $CD_c+\Delta$ of the respective channel from which the feedback signal is extracted.

An example of dither algorithm might look as follows: If the feedback signal FB reports an improvement, the signal processing (PC+PMF cascade) of all channels (within the wavelength band of this dither channel) are moved to $CD_c+\Delta$ or a related value. Otherwise the other direction, namely $CD_c-\Delta$ is tested. Finally the optimum new $CD_c=CD_c\pm\Delta$ is applied (together with the right PMD compensating W).

ii. For the bipolar FB signal which is a direct measure of the CD, the compensator dispersion $CD_c$ can directly be deduced and inputted for the calculation of the PC settings together with the PMD compensating polarization transfer function W. $CD_c$ should compensate the link dispersion $CD_{link}$ hence $CD_c=-CD_{link}$. If the measured $CD_m$ is extracted from the output side (FB1), then this value is the sum of the link CD (to be compensated) plus the compensator CD: $CD_m=CD_{link}+CD_c$. When measured at the input side (FB4), then the link CD is measured: $CD_m=CD_{link}$.

The states of polarization SOP at different spectral positions can be described by the real 3-dimensional Stokes vector $S(\omega)$ or by the complex 2-dimensional Jones vector $a(\omega)$.

Figure 4:
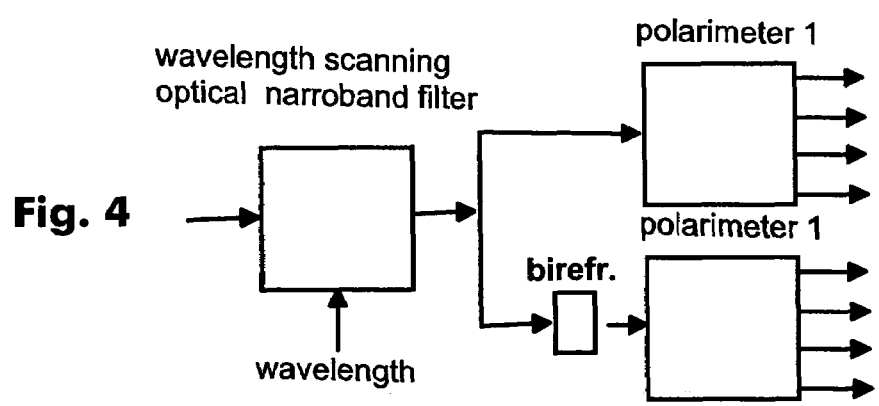
FIG. 4 is a diagram of an alternative polarization of the wavelength scanning polarimeter

The mathematical calculus is explained in more detail below:

For PMD compensation, the output SOP (state-of-polarization) is measured by a wavelength scanning polarimeter. A state-of-the-art realization is shown in FIG. 4. A tunable narrowband optical filter selects a subband of the optical signal spectrum. The wavelength is commanded by the adaptation control. The output is launched into a standard polarimeter setup which determines the relative optical power of differently polarized components of the signal, selected by polarizers with different polarization pass axes by photo diodes. As shown in the FIGS. 4, 11, 12 and 13 are the photo currents for linear 0 degree, linear 45 degree, and left hand circular polarized components. 10 is the total power of the signal. The Stokes vector (point on the Poincaré sphere) is given by $$S := \frac{\begin{pmatrix} I_1 \\ I_2 \\ I_3 \end{pmatrix}}{I_0} - \frac{\begin{pmatrix} 1 \\ 1 \\ 1 \end{pmatrix}}{2}$$

The relation between the Stokes vector representation of the SOP and the Jones vector presentation $$a := \begin{pmatrix} \cos(\theta) \\ \sin(\theta) \cdot \exp(i \cdot \phi) \end{pmatrix}$$

is $$S := \begin{bmatrix} 2 \cdot \left\| \bar{a} \cdot \begin{pmatrix} 1 \\ 0 \end{pmatrix} \right\|^2 - 1 \\ 2 \cdot \left\| \bar{a} \cdot \left[ \frac{1}{\sqrt{2}} \cdot \begin{pmatrix} 1 \\ 1 \end{pmatrix} \right] \right\|^2 - 1 \\ 2 \cdot \left\| \bar{a} \cdot \left[ \frac{1}{\sqrt{2}} \cdot \begin{pmatrix} 1 \\ i \end{pmatrix} \right] \right\|^2 - 1 \end{bmatrix}$$

with the primed a vector denoting the conjugated complex vector. In a $\theta$ and $\phi$ describe amplitude of the both axes and mutual phase difference, respectively.

An alternative realization of the wavelength scanning polarimeter is shown in FIG. 4, where two polarimeters are operating in parallel. The signal launched into the lower one is pre-processed by an optical birefringent element. This element could improve the chromatic dispersion compensation at positions, where the optical signal processing in FIG. 1 or 2, the PC and PMF cascade, is not in a position to efficiently transfer the signal's phase distortion (due to chromatic dispersion) into a polarization variation within the signal spectrum. In this case the known birefringence will serve as discriminating element.

The PC setting can be calculated as follows:

The input field (cf. FIG. 1 or 2) can be described by a Jones vector $a_{in}(\omega)$, which is wavelength independent in the case of no PMD, a scalar amplitude spectrum $b(\omega)$ and a phase spectrum $\phi(\omega)$.

$$E_{in}(\omega) := a_{in}(\omega) e^{j \cdot \phi_{in}(\omega)} \cdot b(\omega) \cdot E_0 \qquad \text{eq. 1}$$

The phase spectrum $\phi(\omega)$ has quadratic and higher-order components in the case of a chromatic dispersion distortion:

$$\phi(\omega) := \phi_0 + \tau_g \cdot (\omega - \omega_0) - CD \cdot \frac{\lambda^2}{4 \cdot \pi \cdot c_0} \cdot (\omega - \omega_0)^2 \qquad \text{eq. 2}$$

Here a constant chromatic dispersion was assumed with CD describing the dispersion of the fiber in ps/nm of the link.

At the output of the compensator the optical field can be written in a similar form:

$$E(\omega):=a(\omega)\cdot e^{j\cdot\phi(\omega)}\cdot b(\omega)\cdot E_0 \qquad \text{eq. 3}$$

From the measured polarization spectrum $a(\omega)$ the PMD of the link (if the polarimeter is placed at the input) or of link plus compensator (if the polarimeter is placed at the output, as shown by FIG. 1 or 2) can be calculated. This is possible since the polarization transfer through the PC-PMF cascade is known by the applied settings $p_{ik}$:

$$a(\omega,p_{ik})\cdot e^{j\cdot\phi in(\omega)+\Delta\phi(\omega)} := W(p_{ik})\cdot a_{in}\cdot e^{j\cdot\phi in(\omega)} \qquad \text{eq. 4}$$

with the Jones matrix W describing the polarization change and $\Delta\phi$ the chromatic dispersion generated by the compensator. $\phi_{in}+\Delta\phi=\phi$ is the output phase spectrum.

$$W(p_{ik}) := e^{j\cdot\Delta\cdot\phi(\omega)}\cdot \prod_{k=N}^{1} F_k \cdot M_k(p_{k,1}, p_{k,2} \ldots p_{k,m}) \qquad \text{eq. 5}$$

W is decomposed into factors Fk and Mk. They describe the matrices of the birefringence PMFk and the polarization controller PCk, respectively. The setting parameters of the PC, which are controlled by the adaptation control unit, are $p_{k,i}$. For a specific relization of the PC, these might be two parameters $p_1=\xi$ and $p_2=\theta$, the matrix might be written as follows:

$$M(\theta,\xi) := \begin{pmatrix} \cos\xi & j\sin\xi \\ -j\sin\xi & \cos\xi \end{pmatrix} \cdot \begin{pmatrix} \exp\left(j\cdot\frac{\theta}{2}\right) & 0 \\ 0 & \exp\left(-j\cdot\frac{\theta}{2}\right) \end{pmatrix} \cdot \begin{pmatrix} \cos\xi & -j\sin\xi \\ j\sin\xi & \cos\xi \end{pmatrix} \qquad \text{eq. 6}$$

Other realization of PC with a different Jones matrix and different setting parameters pi are also possible. The choice is mainly determined by the technology. Thus, for the PC a cascade of differently oriented wave plates and tunable Faraday rotators might by suitable for an advantageous realization. The birefringence PMF with a differential group delay $\Delta\tau$ (e.g. 50 ps for 10 Gb/s signals) and an angel $\theta$ of the principal polarization state has a Jones matrix:

$$F:=R^{-1}\cdot D\cdot R \qquad \text{eq. 7}$$

with $$R(\theta) := \begin{bmatrix} \cos\theta & j\sin\theta \\ -(j\sin\theta) & \cos\theta \end{bmatrix} \qquad \text{eq. 8}$$

$$D(\Delta\tau) := \begin{pmatrix} \exp(-j\cdot\Delta\tau\cdot\omega) & 0 \\ 0 & 0 \end{pmatrix}. \qquad \text{eq. 9}$$

Two ways are possible for finding the appropriate PC parameters $p_{ik}$ which minimize the CD and the PMD distortion:

i) With the input signal CD and PMD calculated in conjunction with the feedback signal measurements, the setting $p_{ik}$ of the PCs can be commanded via a look-up table, which has been generated by simulation or by experiments. This might only be applicable for pure CD compensation.

ii) With the input signal CD and PMD calculated in conjunction with the feedback signal measurements, the setting $p_{ik}$ of the PCs can be found in by numerical iteration. An example is explained below:

With input PMD and CD the parameters $a_{in}(\omega)$ and $\phi_{in}(\omega)$ are known.

With these values for every PC setting $p_{ik}$ the output values $a'(\omega,p)$ and $\phi'(\omega,p)$ can be calculated (Eq. 4+5).

Moreover, with a target CD (given by the CD adaptation algorithm) and minimum PMD of the signal at the output, also target values of the polarization spectrum and phase spectrum can be calculated: $a_c(\omega)$ and $\phi_c(\omega)$.

The setting of the compensator $p_{ik}$ can be varied in an iterative process to minimize the differences simultaneously: $|a_c(\omega)-a'(\omega,p)|$ and $|\phi_c(\omega)-\phi'(\omega,p)|$. It might be advantageous to weight the differences by the amplitude spectrum or the power spectrum $|b(\omega)|$ or $b^2(\omega)$, respectively. These values can be measured or estimated for the signal.

The invention claimed is:

1. A method for performing optical dispersion compensation of wave-length division multiplexed (WDM) optical signals, the method comprising:
   providing a compensation stage comprising:
      an optical transmission medium,
      parallel operating cascaded polarization controllers, and
      optical birefringent elements;
   wherein the compensation stage compensates dispersion of the WDM optical signals when the WDM optical signals are transmitted spectrally dispersed into wavelength channels through the parallel polarization controllers;
   determining polarization states of the spectral components of the optical signals for each of the wavelength channels;
   defining a first feedback signal required for setting the polarization controllers when compensating with the parallel polarization controllers for each wavelength channel;
   determining the chromatic dispersion of the optical signals of at least one wavelength channel, and extrapolating the chromatic dispersion of the other wavelength channels based on the determined chromatic dispersion;
   defining a second feedback signal required when compensating for the chromatic dispersion at each wavelength channel;
   calculating the polarization controller setting per wavelength channel based on the first and second feedback signals;
   applying the respective setting on the parallel polarization controllers, and compensating the optical dispersion of the WDM optical signals at each wavelength channel.

2. The method for performing optical dispersion compensation according to claim 1, further comprising determining the chromatic dispersion based on a measure of WDM optical signal quality at one of the wavelength channels.

3. The method for performing optical dispersion compensation according to claim 2, further comprising varying the polarization controller setting per wavelength channel based on the chromatic dispersion feedback signal to obtain an improved signal quality, and keeping the polarization mode dispersion compensation of the WDM optical signal at an optimum value.

4. The method according to claim 1, wherein the second feedback signal is a scalar signal which is maximized or minimized.

5. The method according to claim 4, wherein the scalar signals is a forward error correction error count.

6. The method according to claim 1, wherein the feedback signal for compensating for chromatic dispersion is based on a direct measure of the chromatic dispersion.

7. The method according to claim 1, further comprising extracting the second feedback signal from a common output of the compensation stage via an optical filter.

8. The method according to claim 1, further comprising extracting the second feedback signal from an input of the compensation stage.

9. A computer readable medium having software instructions thereon, the software instructions adapted to enable a control unit for an optical transmission medium to be used as polarization controllers to compensate for dispersion of wavelength division multiplexed (WDM) optical signals, the instructions comprising the operations of:

collecting a first feedback signal for setting parallel polarization controllers when compensating polarization mode dispersion of WDM optical signals transmitted spectrally dispersed into different wavelength channels through the parallel polarization controllers;

collecting a second feedback signal for compensating a chromatic dispersion at each wavelength channel;

calculating a polarization controller setting per wavelength channel based on the first and second feedback signals;

applying setting on the parallel polarization controllers to compensate for optical dispersion of the WDM optical signals at each wavelength channel.

* * * * *